US012634657B2

(12) United States Patent (10) Patent No.: US 12,634,657 B2
Jin et al. (45) Date of Patent: May 19, 2026

(54) COMMUNICATION CONTROL METHOD AND APPARATUS OF MOBILE CLEANING DEVICE, MEDIUM, AND CLEANING SYSTEM

(71) Applicant: WUXI LITTLE SWAN ELECTRIC CO., LTD., Wuxi (CN)

(72) Inventors: Mingfu Jin, Wuxi (CN); Pengzhan Wang, Wuxi (CN); Zhongcheng Su, Wuxi (CN); Qingyong Yu, Wuxi (CN)

(73) Assignee: WUXI LITTLE SWAN ELECTRIC CO., LTD., Wuxi (CN)

( * ) Notice: Subject to any disclaimer, the term of this patent is extended or adjusted under 35 U.S.C. 154(b) by 278 days.

(21) Appl. No.: 18/685,104

(22) PCT Filed: Jun. 29, 2023

(86) PCT No.: PCT/CN2023/104255
§ 371 (c)(1),
(2) Date: Feb. 20, 2024

(87) PCT Pub. No.: WO2024/055703
PCT Pub. Date: Mar. 21, 2024

(65) Prior Publication Data
US 2025/0133370 A1 Apr. 24, 2025

(30) Foreign Application Priority Data
Sep. 15, 2022 (CN) .......................... 202211131565.4

(51) Int. Cl.
G05D 1/00 (2024.01)
A01D 34/00 (2006.01)
(Continued)

(52) U.S. Cl.
CPC ............. H04W 4/029 (2018.02); A47L 11/24 (2013.01); A47L 11/4011 (2013.01);
(Continued)

(58) Field of Classification Search
None
See application file for complete search history.

(56) References Cited

U.S. PATENT DOCUMENTS 7,642,745 B2 * 1/2010 Kaneko ................. B25J 19/005
320/107
8,150,551 B2 * 4/2012 Kaneko .................... H02J 7/70
455/462
(Continued)

FOREIGN PATENT DOCUMENTS

CN 109363586 A 2/2019
CN 111449572 A 7/2020
(Continued)

OTHER PUBLICATIONS

International Search Report and Written Opinion dated Aug. 7, 2023 received in International Patent Application No. PCT/CN2023/104255.
(Continued)

*Primary Examiner* — Tuan A Tran
(74) *Attorney, Agent, or Firm* — Scully, Scott, Murphy & Presser, P.C.

(57) ABSTRACT

A communication control method and apparatus of a mobile cleaning device, a computer-readable storage medium, and a cleaning system are provided. The communication control method of the mobile cleaning device includes the following operations. A base station position acquisition instruction is sent to a cloud through a second wireless communication network, after it is determined that a first wireless communication network between the mobile cleaning device and a base station is disconnected. Base station position information sent by the cloud based on the base station position acquisition instruction is received through the second wireless communication network. The base station position
(Continued)

WIFI
connection

Cloud

WIFI
connection

Bluetooth
connection

Washing machine
and base station

Sweeper A1

Sweeper A2 information is acquired by the cloud from a laundry treatment device through the second wireless communication network.

15 Claims, 7 Drawing Sheets

(51) Int. Cl.

| | | |
|---|---|---|
| *A47L 11/24* | (2006.01) |
| *A47L 11/40* | (2006.01) |
| *D06F 34/05* | (2020.01) |
| *H04W 4/029* | (2018.01) |

(52) U.S. Cl.

CPC .......... *A47L 11/4091* (2013.01); *D06F 34/05* (2020.02); *A47L 2201/02* (2013.01)

(56) References Cited

U.S. PATENT DOCUMENTS

| | | | | |
|---|---|---|---|---|
| 9,211,641 | B2 * | 12/2015 | Ogawa | B25J 19/005 |
| 10,894,484 | B2 * | 1/2021 | Han | B60L 53/67 |
| 11,285,838 | B2 * | 3/2022 | Vliet | B60L 53/57 |
| 11,511,634 | B2 * | 11/2022 | Kim | B60L 53/12 |
| 11,560,158 | B2 * | 1/2023 | Kim | B60W 60/00253 |
| 11,609,575 | B2 * | 3/2023 | Hong | G01S 17/10 |
| 11,642,798 | B2 * | 5/2023 | Kwak | B25J 19/0066 |
| | | | | 700/248 |
| 11,724,603 | B2 * | 8/2023 | Han | G05D 1/247 |
| | | | | 320/109 |
| 11,755,882 | B2 * | 9/2023 | Lee | G06N 3/043 |
| | | | | 706/21 |
| 11,906,972 | B2 * | 2/2024 | Lee | G05D 1/0276 |
| 11,910,742 | B2 * | 2/2024 | Ko | B60L 53/36 |
| 11,960,278 | B2 * | 4/2024 | Ko | G05D 1/0282 |
| 11,989,017 | B2 * | 5/2024 | Ko | B60L 53/30 |
| 2019/0126775 | A1 * | 5/2019 | Han | B60L 3/12 |
| 2020/0053324 | A1 | 2/2020 | Deyle et al. | |
| 2020/0341477 | A1 * | 10/2020 | Baek | G05D 1/0044 |
| 2021/0046831 | A1 * | 2/2021 | Kim | B60L 53/12 |
| 2021/0146552 | A1 * | 5/2021 | Hong | A47L 11/4011 |
| 2022/0206507 | A1 | 6/2022 | Herlant et al. | |

FOREIGN PATENT DOCUMENTS

| | | |
|---|---|---|
| CN | 111694360 A | 9/2020 |
| CN | 112004245 A | 11/2020 |
| CN | 112203248 A | 1/2021 |
| CN | 112953798 A | 6/2021 |
| CN | 113370209 A | 9/2021 |
| CN | 113491480 A | 10/2021 |
| CN | 114040340 A | 2/2022 |
| CN | 114995237 A | 9/2022 |
| RU | 2760625 C1 | 11/2021 |
| RU | 2769632 C1 | 4/2022 |
| WO | 2021003937 A1 | 1/2021 |
| WO | 2023109117 A1 | 6/2023 |

OTHER PUBLICATIONS

Extended European search report dated Sep. 30, 2024 received in European Patent Application No. 23841581.4.
Decision to Grant a Patent dated Jul. 16, 2024 received in Russian Patent Application No. 2024104442/07.
Luo F. et al., "The Application of UWB Indoor Positioning Technology in the Development of Mobile Robots", Journal of Fujian Computer, vol. 37, No. 7 (Jul. 2021).
Chinese Office Action dated Jan. 26, 2026 received in Chinese Application No. 202211131565.4.

* cited by examiner

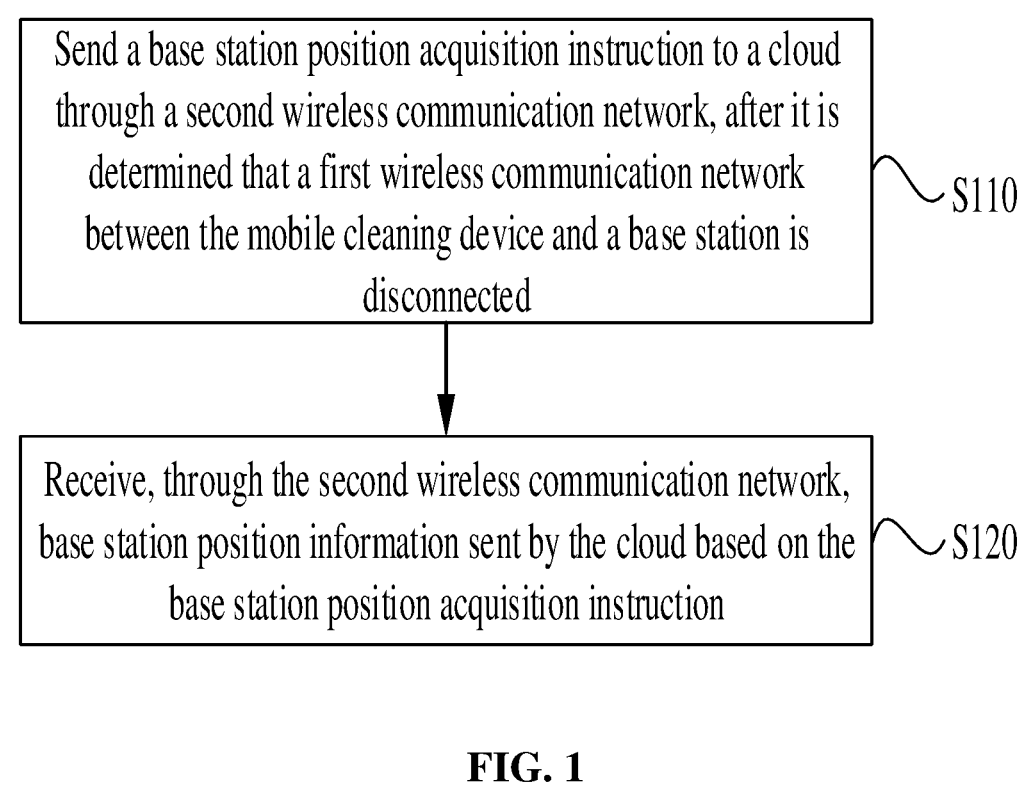

Send a base station position acquisition instruction to a cloud through a second wireless communication network, after it is determined that a first wireless communication network between the mobile cleaning device and a base station is disconnected ⌇S110

Receive, through the second wireless communication network, base station position information sent by the cloud based on the base station position acquisition instruction ⌇S120

FIG. 1

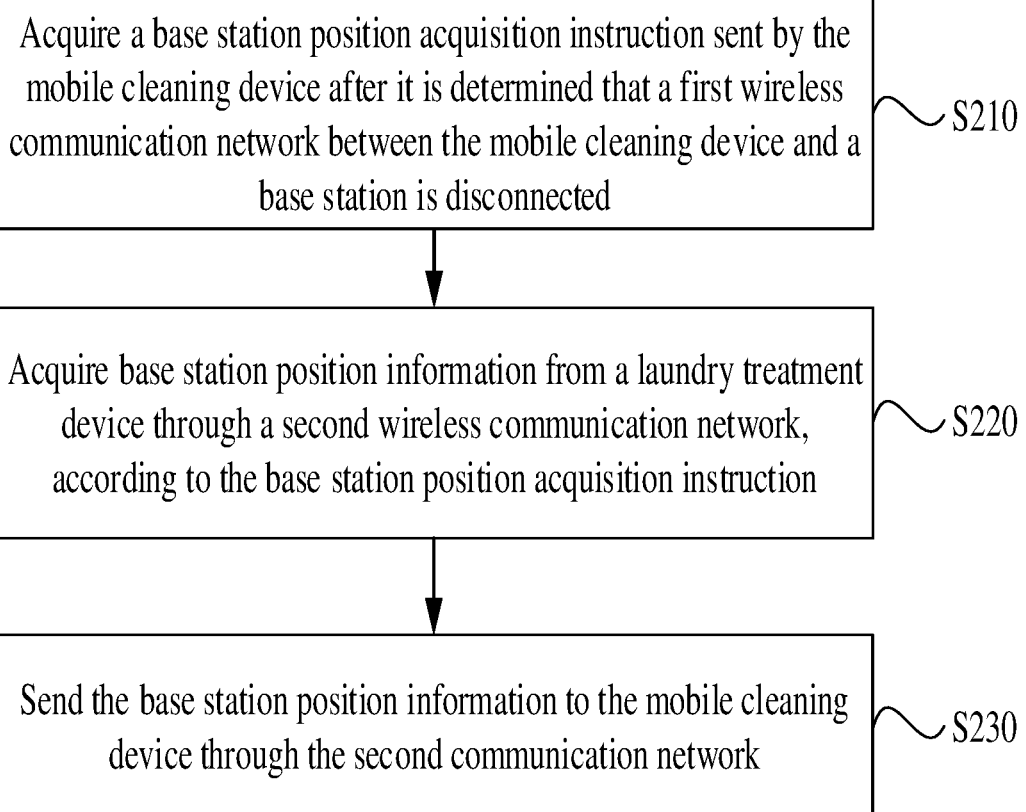

Acquire a base station position acquisition instruction sent by the mobile cleaning device after it is determined that a first wireless communication network between the mobile cleaning device and a base station is disconnected ∽S210

Acquire base station position information from a laundry treatment device through a second wireless communication network, according to the base station position acquisition instruction ∽S220

Send the base station position information to the mobile cleaning device through the second communication network ∽S230

FIG. 2

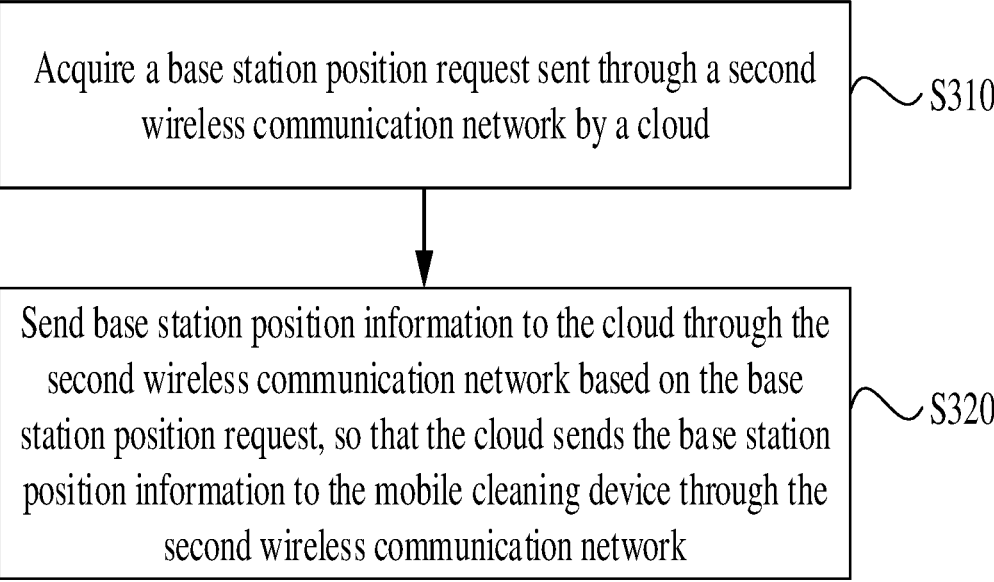

Acquire a base station position request sent through a second wireless communication network by a cloud ~S310

Send base station position information to the cloud through the second wireless communication network based on the base station position request, so that the cloud sends the base station position information to the mobile cleaning device through the second wireless communication network ~S320

FIG. 3 base station position request
acquiring module                     61 second base station position
information sending module            62

COMMUNICATION CONTROL METHOD AND APPARATUS OF MOBILE CLEANING DEVICE, MEDIUM, AND CLEANING SYSTEM

CROSS-REFERENCE TO RELATED APPLICATIONS

This application is a National Stage Entry under 35 U.S.C. § 371 of PCT International Application No. PCT/CN2023/104255, filed on Jun. 29, 2023, which claims priority to Chinese Patent application No. 202211131565.4 filed on Sep. 15, 2022 and entitled "COMMUNICATION CONTROL METHOD AND APPARATUS OF MOBILE CLEANING DEVICE, MEDIUM, AND CLEANING SYSTEM", the entire contents of each of which are hereby incorporated by reference.

FIELD

The disclosure relates to the field of intelligent cleaning, and in particular, to a communication control method and apparatus of a mobile cleaning device, a medium, and a cleaning system.

BACKGROUND

In recent years, mobile cleaning devices, such as a sweeper or the like, have become more and more common in our lives, and may replace manual labor to clean a floor, saving time and effort. When the sweeper is not in use, it is usually in standby or charging in a base station of the sweeper. When the sweeper is required for cleaning, the sweeper leaves the base station to clean the floor.

A data communication is usually performed between the sweeper and the base station via Bluetooth. After the sweeper reaches a designated position and completes cleaning operations, it returns to the base station for charging, etc. However, there is a limited data transmission distance of Bluetooth communication, and when a distance between the sweeper and the base station exceeds an effective data transmission distance of Bluetooth, an effective data transmission cannot be made between the sweeper and the base station. The sweeper cannot return to the base station, which affects usage of the sweeper.

SUMMARY

(I) Technical Problem to be Solved

The technical problem to be solved by the disclosure is to solve a problem where an existing mobile cleaning device such as a sweeper or the like has a limited data transmission distance of Bluetooth communication, and when the distance between the sweeper and the base station exceeds the effective data transmission distance of Bluetooth, an effective data transmission cannot be made between the sweeper and the base station, the sweeper cannot return to the base station, which affects usage of the sweeper.

(II) Technical Solutions

In order to solve the above technical problem, the disclosure provides a communication control method and apparatus of a mobile cleaning device, a medium, and a cleaning system, which may prevent a situation where a data transmission between the mobile cleaning device and the base station cannot be achieved after a communication network between the mobile cleaning device and the base station is disconnected, resulting in that the mobile cleaning device cannot return to the base station.

According to a first aspect, the disclosure provides a communication control method of a mobile cleaning device, the method includes the following operations.

A base station position acquisition instruction is sent to a cloud through a second wireless communication network, after it is determined that a first wireless communication network between the mobile cleaning device and a base station is disconnected.

Base station position information sent by the cloud based on the base station position acquisition instruction, is received through the second wireless communication network.

The base station position information is acquired by the cloud from a laundry treatment device through the second wireless communication network.

In some embodiments, the method may further include the following operations.

The base station position information is acquired from the base station through the first wireless communication network, after it is determined that the first wireless communication network between the mobile cleaning device and the base station is connected.

According to a second aspect, the disclosure further provides a communication control method of a mobile cleaning device, the method includes the following operations.

A base station position acquisition instruction sent by the mobile cleaning device after it is determined that a first wireless communication network between the mobile cleaning device and a base station is disconnected, is acquired.

Base station position information is acquired from a laundry treatment device through a second wireless communication network, according to the base station position acquisition instruction.

The base station position information is sent to the mobile cleaning device through the second wireless communication network.

In some embodiments, the operation of acquiring the base station position information from the laundry treatment device through the second wireless communication network, according to the base station position acquisition instruction may include the following operations.

A base station position request is sent to the laundry treatment device through the second wireless communication network, according to the base station position acquisition instruction.

The base station position information sent by the laundry treatment device based on the base station position request, is acquired through the second wireless communication network.

According to a third aspect, the disclosure further provides a communication control method of a mobile cleaning device, the method includes the following operations.

A base station position request sent by a cloud through a second wireless communication network, is acquired.

Base station position information is sent to the cloud through the second wireless communication network based on the base station position request, so that the cloud sends the base station position information to the mobile cleaning device through the second wireless communication network.

The base station position request is generated by the cloud after acquiring a base station position acquisition instruction sent by the mobile cleaning device, the base station position acquisition instruction is sent to the cloud by the mobile cleaning device after it is determined that a first wireless communication network between the mobile cleaning device and a base station is disconnected.

In some embodiments, the method may further include the following operations before sending the base station position information to the cloud through the second wireless communication network based on the base station position request.

Position request information is sent to the base station, so that the base station sends the base station position information to the laundry treatment device based on the position request information.

In some embodiments, the laundry treatment device may be connected with the base station through a wired or wireless communication network.

In some embodiments, the first communication network may include a Bluetooth communication network.

In some embodiments, the second communication network may include a wireless fidelity (WiFi) communication network.

According to a fourth aspect, the disclosure provides a communication control apparatus of a mobile cleaning device, the apparatus includes a base station position acquisition instruction sending module and a first base station position information receiving module.

The base station position acquisition instruction sending module is configured to send a base station position acquisition instruction to a cloud through a second wireless communication network, after it is determined that a first wireless communication network between the mobile cleaning device and a base station is disconnected.

The first base station position information receiving module is configured to receive, through the second wireless communication network, base station position information sent by the cloud based on the base station position acquisition instruction.

The base station position information is acquired by the cloud from a laundry treatment device through the second wireless communication network.

According to a fifth aspect, the disclosure further provides a communication control apparatus of a mobile cleaning device, the apparatus includes a base station position acquisition instruction acquiring module, a base station position information acquiring module, and a first base station position information sending module.

The base station position acquisition instruction acquiring module is configured to acquire a base station position acquisition instruction sent by the mobile cleaning device after it is determined that a first wireless communication network between the mobile cleaning device and a base station is disconnected.

The base station position information acquiring module is configured to acquire base station position information from a laundry treatment device through a second wireless communication network, according to the base station position acquisition instruction.

The first base station position information sending module is configured to send the base station position information to the mobile cleaning device through the second wireless communication network.

According to a sixth aspect, the disclosure further provides a communication control apparatus of a mobile cleaning device, the apparatus includes a base station position request acquiring module and a second base station position information sending module.

The base station position request acquiring module is configured to acquire a base station position request sent by a cloud through a second wireless communication network.

The second base station position information sending module is configured to send base station position information to the cloud through the second wireless communication network based on the base station position request, so that the cloud sends the base station position information to the mobile cleaning device through the second wireless communication network.

The base station position request is generated by the cloud after acquiring a base station position acquisition instruction sent by the mobile cleaning device, the base station position acquisition instruction is sent to the cloud by the mobile cleaning device after it is determined that a first wireless communication network between the mobile cleaning device and a base station is disconnected.

According to a seventh aspect, the disclosure further provides a computer-readable storage medium, the storage medium stores programs or instructions, the programs or instructions enable a computer to perform the communication control method of the mobile cleaning device according to any one of the embodiments of the first aspect to the third aspect.

According to an eighth aspect, the disclosure provides a cleaning system, the cleaning system includes a mobile cleaning device, a laundry treatment device, and a base station.

The mobile cleaning device sends a base station position acquisition instruction to a cloud through a second wireless communication network, after it is determined that a first wireless communication network between the mobile cleaning device and the base station is disconnected. The cloud acquires base station position information from the laundry treatment device through the second wireless communication network, based on the base station position acquisition instruction, and sends the base station position information to the mobile cleaning device through the second wireless communication network.

(III) Advantageous Effects

Compared with the related art, the above technical solutions provided in the embodiments of the disclosure have advantages as follows.

The communication control method of the mobile cleaning device provided in the disclosure includes the following operations. A base station position acquisition instruction is sent to a cloud through a second wireless communication network, after it is determined that a first wireless communication network between the mobile cleaning device and a base station is disconnected; base station position information sent by the cloud based on the base station position acquisition instruction, is received through the second wireless communication network, here the base station position information is acquired by the cloud from a laundry treatment device through the second wireless communication network. Since the mobile cleaning device is usually connected with the base station through the first wireless communication network, and thus after the first wireless communication network is disconnected, the mobile cleaning device cannot be communicated with the base station directly and cannot acquire the base station position information. At this time, the mobile cleaning device of the embodiments of the disclosure may acquire the base station position information from the cloud through the second wireless communication network, so that the mobile cleaning device may return to the base station. The disclosure may prevent a situation where a data transmission between the mobile cleaning device and the base station cannot be achieved after the first communication network between the mobile cleaning device and the base station is disconnected, resulting in that the mobile cleaning device cannot return to the base station.

It is understood that the above general descriptions and detailed descriptions below are only exemplary and explanatory, and cannot limit the disclosure.

BRIEF DESCRIPTION OF THE DRAWINGS

The drawings here are incorporated in the description and constitute a part of the description, illustrate embodiments consistent with the disclosure, and are intended to explain principles of the disclosure together with the description.

In order to explain the embodiments of the disclosure or technical solutions in the related art more clearly, the drawings required to be used in descriptions of the embodiments or the related art will be briefly introduced below. It is apparent that other drawings may also be obtained by those of ordinary skill in the art according to these drawings, without paying any creative work.

FIG. 1 is a schematic flowchart of a communication control method of a mobile cleaning device provided in an embodiment of the disclosure.

FIG. 2 is a schematic flowchart of another communication control method of a mobile cleaning device provided in an embodiment of the disclosure.

FIG. 3 is a schematic flowchart of yet another communication control method of a mobile cleaning device provided in an embodiment of the disclosure.

DETAILED DESCRIPTION

Figure 4:
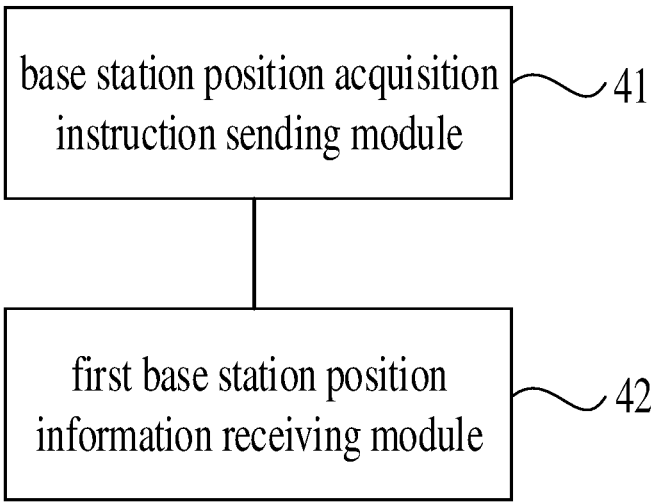
FIG. 4 is a structural block diagram of a communication control apparatus of a mobile cleaning device provided in an embodiment of the disclosure.

In order to make purposes, technical solutions and advantages of the embodiments of the disclosure clearer, the technical solutions of the embodiments of the disclosure will be described clearly and fully below. It is apparent that the described embodiments are only some embodiments of the disclosure, rather than all embodiments of the disclosure. Based on the embodiments of the disclosure, all other embodiments obtained by those of ordinary skill in the art without paying any creative work fall within the scope of protection of the disclosure.

An embodiment of the disclosure provides a communication control method of a mobile cleaning device. The method may be performed by a communication control apparatus of a mobile cleaning device provided in an embodiment of the disclosure, and the communication control apparatus of the mobile cleaning device may be implemented by way of software and/or hardware. The communication control apparatus of the mobile cleaning device may be integrated in the mobile cleaning device. The communication control method of the mobile cleaning device provided in the embodiment of the disclosure may be applied to an application scenario where the mobile cleaning device performs cleaning operations. Types of the mobile cleaning device are not limited in the embodiment of the disclosure. FIG. 1 is a schematic flowchart of a communication control method of a mobile cleaning device provided in an embodiment of the disclosure, the communication control method of the mobile cleaning device includes the following operations S110 and S120.

At S110, a base station position acquisition instruction is sent to a cloud through a second wireless communication network, after it is determined that a first wireless communication network between the mobile cleaning device and a base station is disconnected.

The mobile cleaning device is usually connected with the base station through the first wireless communication network. The base station sends base station position information to the mobile cleaning device through the first wireless communication network. When the mobile cleaning device is used, the mobile cleaning device will leave the base station and perform cleaning operations on a floor. When it needs to control the mobile cleaning device to return to the base station to perform charging or other operations, in a case that the first wireless communication network is disconnected due to a weak signal or a too far distance between the mobile cleaning device and the base station, the mobile cleaning device cannot directly acquire the base station position information from the base station, that is, cannot return to the base station. After it is determined that the first wireless communication network is disconnected, the mobile cleaning device does not communicate with the base station through the first wireless communication network any more. Since the mobile cleaning device is connected with the cloud through the second wireless communication network, the mobile cleaning device may send the base station position acquisition instruction to the cloud through the second wireless communication network.

At S120, base station position information sent by the cloud based on the base station position acquisition instruction, is received through the second wireless communication network.

The mobile cleaning device is connected with the cloud through the second wireless communication network. The cloud receives the base station position acquisition instruction sent by the mobile cleaning device and then acquires the base station position information. Then, the mobile cleaning device receives, through the second wireless communication network, the base station position information acquired by the cloud. Therefore, after the first wireless communication network is disconnected, the mobile cleaning device may acquire the base station position information from the cloud through the second wireless communication network, to return the base station.

The base station position information is acquired by the cloud from a laundry treatment device through the second wireless communication network.

Exemplarily, the mobile cleaning device is a sweeper, and the laundry treatment device is a washing machine. The sweeper is connected with the cloud through the first wireless communication network. The sweeper will leave the base station when the sweeper performs sweep operations, and the sweeper needs to return to the base station for charging when its quantity of electricity is low. However, in a case that the sweeper moves by a far distance to go beyond a communication distance of the first wireless communication network, the communication network between the sweeper and the base station is disconnected, so that the sweeper cannot communicate with the base station, cannot determine the position of the base station, and thus cannot return to the base station for charging. At this time, after confirming that the first wireless communication network between the sweeper and the base station is disconnected, the sweeper may send, through the second wireless communication network, the base station position acquisition instruction to the cloud connected therewith, the cloud acquires the base station position information from the washing machine through the second wireless communication network, the sweeper acquires the base station position information from the cloud and then may return to the base station. Therefore, it meets that after the first wireless communication network is disconnected, the base station position information may still be acquired through the second wireless communication network.

According to the communication control method provided in the embodiment of the disclosure, when the first wireless communication network between the mobile cleaning device and the base station is disconnected, and the mobile cleaning device cannot be directly connected with the base station and cannot acquire the base station position information at this time, the base station position information may be acquired through the second wireless communication network, and the mobile cleaning device may return to the base station. The laundry treatment device may acquire the base station position information, and the cloud acquires the base station position information from the laundry treatment device through the second wireless communication network. The disclosure may prevent a situation where a data transmission between the mobile cleaning device and the base station cannot be achieved after the communication network between the mobile cleaning device and the base station is disconnected, resulting in that the mobile cleaning device cannot return to the base station. Since the mobile cleaning device may communicate with the cloud through the second wireless communication network, the cloud may also communicate with a laundry cleaning device through the second wireless communication network, the mobile cleaning device may also indirectly acquire the base station position information even though it is far away from the base station. Therefore, the embodiment of the disclosure may also increase a range of motion of the mobile cleaning device.

In some embodiments, the communication control method of the mobile cleaning device provided in the embodiment of the disclosure may further include the following operations.

The base station position information is acquired from the base station through the first wireless communication network, after it is determined that the first wireless communication network between the mobile cleaning device and the base station is connected.

During usage of the mobile cleaning device, in a case that the first wireless communication network between the mobile cleaning device and the base station is always in a normal connection state, it means that the mobile cleaning device may directly communicate with the base station through the first wireless communication network at this time. When the mobile cleaning device needs to return to the base station, the mobile cleaning device may acquire the base station position information through the first wireless communication network, and return to the base station according to the acquired base station position information.

In an embodiment, a communication coverage distance of the first wireless communication network is smaller than that of the second wireless communication network. Therefore, after the first wireless communication network is disconnected, the second wireless communication network with a large communication coverage distance may be used to perform data transmission. Furthermore, in order to reduce cost, only communication modules of the first wireless communication network may be included in the base station, therefore it may save cost and it is unnecessary to add other communication modules to the base station.

An embodiment of the disclosure further provides a communication control method of a mobile cleaning device. The method may be performed by another communication control apparatus of a mobile cleaning device provided in an embodiment of the disclosure, and the communication control apparatus of the mobile cleaning device may be implemented by way of software and/or hardware. The communication control apparatus of the mobile cleaning device may be integrated in the cloud. The communication control method of the mobile cleaning device provided in the embodiment of the disclosure may be applied to an application scenario where the mobile cleaning device performs cleaning operations. Types of the mobile cleaning device are not limited in the embodiment of the disclosure. FIG. 2 is a schematic flowchart of another communication control method of a mobile cleaning device provided in an embodiment of the disclosure, and as shown in FIG. 2, the communication control method of the mobile cleaning device includes the following operations S210 to S230.

At S210, a base station position acquisition instruction sent by the mobile cleaning device after it is determined that a first wireless communication network between the mobile cleaning device and a base station is disconnected, is acquired.

After the first wireless communication network between the mobile cleaning device and the base station is disconnected, the mobile cleaning device may send the base station position acquisition instruction to the cloud. The cloud is connected with the mobile cleaning device through a second wireless communication network, and the cloud may acquire the base station position acquisition instruction sent by the mobile cleaning device, through the second wireless communication network.

At S220, base station position information is acquired from a laundry treatment device through a second wireless communication network, according to the base station position acquisition instruction.

After receiving the base station position acquisition instruction, the cloud acquires the base station position information according to the base station position acquisition instruction. The cloud is connected with the laundry treatment device through the second wireless communication network, and the laundry treatment device may obtain the base station position information. Therefore, the cloud may acquire the base station position information from the laundry treatment device through the second wireless communication network.

At S230, the base station position information is sent to the mobile cleaning device through the second wireless communication network.

After acquiring the base station position information, the cloud sends the base station position information to the mobile cleaning device through the second wireless communication network. Therefore, the mobile cleaning device may also obtain the base station position information in a case that the first wireless communication network is disconnected, and then may return to the base station according to the acquired base station position information.

The communication control method of the mobile cleaning device provided in the embodiment of the disclosure may prevent a situation where a data transmission between the mobile cleaning device and the base station cannot be achieved after the communication network between the mobile cleaning device and the base station is disconnected, resulting in that the mobile cleaning device cannot return to the base station. The base station position information may be indirectly obtained through information interaction between the mobile cleaning device and the cloud, which ensures that the mobile cleaning device may also acquire the base station position information after the communication network between the mobile cleaning device and the base station is disconnected, and then may return to the base station according to the acquired base station position information.

In some embodiments, the operation of acquiring the base station position information from the laundry treatment device through the second wireless communication network, according to the base station position acquisition instruction includes the following operations S221 and S222.

At S221, a base station position request is sent to the laundry treatment device through the second wireless communication network, according to the base station position acquisition instruction.

After receiving the base station acquisition instruction sent by the mobile cleaning device, the cloud may send the base station position request to the laundry treatment device connected with the cloud through the second wireless communication network, to request the laundry treatment device to send the base station position information.

At S222, the base station position information sent by the laundry treatment device based on the base station position request, is acquired through the second wireless communication network.

For example, the base station position information may be stored in the laundry treatment device in advance, or a wired or wireless communication connection may be established between the laundry treatment device and the base station. For example, the base station is arranged near the laundry treatment device, and they are connected by wired communication. Or, the laundry treatment device is connected with the base station through Bluetooth communication. Therefore, the laundry treatment device may obtain the base station position information. In a case that the laundry treatment device receives the base station position request sent by the cloud, the laundry treatment device may send the base station position information to the cloud through the second wireless communication network.

An embodiment of the disclosure further provides a communication control method of a mobile cleaning device. The method may be performed by a communication control apparatus of a mobile cleaning device provided in an embodiment of the disclosure, and the communication control apparatus of the mobile cleaning device may be implemented by way of software and/or hardware. The communication control apparatus of the mobile cleaning device may be integrated in the laundry treatment device. The communication control method of the mobile cleaning device provided in the embodiment of the disclosure may be applied to an application scenario where the mobile cleaning device performs cleaning operations. Types of the mobile cleaning device are not limited in the embodiment of the disclosure. FIG. 3 is a schematic flowchart of yet another communication control method of a mobile cleaning device provided in an embodiment of the disclosure, and as shown in FIG. 3, the communication control method of the mobile cleaning device includes the following operations S310 and S320.

At S310, a base station position request sent by a cloud through a second wireless communication network, is acquired.

The laundry treatment device is connected with the cloud through the second wireless communication network, therefore the laundry treatment device and the cloud transmit information to each other through the second wireless communication network, and the laundry treatment device may acquire the base station position request sent by the cloud.

At S320, base station position information is sent to the cloud through the second wireless communication network based on the base station position request, so that the cloud sends the base station position information to the mobile cleaning device through the second wireless communication network.

The base station position request is generated by the cloud after acquiring a base station position acquisition instruction sent by the mobile cleaning device, the base station position acquisition instruction is sent to the cloud by the mobile cleaning device after determining that a first wireless communication network between the mobile cleaning device and a base station is disconnected.

The laundry treatment device may obtain the base station position information, and then send the base station position information to the cloud according to the base station position request, and the cloud may send the base station position information to the mobile cleaning device. The base station position request is generated by the cloud and is sent to the laundry treatment device, and the base station position acquisition instruction is sent by the mobile cleaning device to the cloud after the first wireless communication network between the mobile cleaning device and the base station is disconnected and it is impossible to directly transmit data between the mobile cleaning device and the base station.

The communication control method of the mobile cleaning device provided in the embodiment of the disclosure may prevent a situation where a data transmission between the mobile cleaning device and the base station cannot be achieved after the communication network between the mobile cleaning device and the base station is disconnected, resulting in that the mobile cleaning device cannot return to the base station.

In some embodiments, the method further includes the following operations before sending the base station position information to the cloud through the second wireless communication network based on the base station position request.

Position request information is sent to the base station, so that the base station sends the base station position information to the laundry treatment device based on the position request information.

After acquiring the base station position request, the laundry treatment device needs to acquire the base station position information. There is a communication connection between the laundry treatment device and the base station, the laundry treatment device and the base station may communicate with each other and transmit data to each other. Therefore, the laundry treatment device may send the position request information to the base station through the communication connection. After receiving the above request, the base station may send its own position to the laundry treatment device, and then the laundry treatment device acquires the base station position information. When the cloud needs the base station position information, the cloud may also acquire the base station position information from the laundry treatment device.

In some embodiments, the laundry treatment device is connected with the base station through a wired or wireless communication network.

The laundry treatment device may be connected through the wired or wireless communication network, to ensure that the laundry treatment device and the base station may communicate with each other. For example, the base station may be arranged near the laundry treatment device. The laundry treatment device communicates with the base station through wires, which may reduce length of a data connection line. Furthermore, since the laundry treatment device is also configured to clean clothes, there are water pipes or sewer pipes around the laundry treatment device, which is also convenient to clean the mobile cleaning device when the mobile cleaning device returns to the base station. In a case that the laundry treatment device is directly connected with the base station through the wireless communication network, types of the wireless communication network may be selected based on a distance between the laundry treatment device and the base station, for example, Bluetooth communication is applicable. Since the base station is connected with the mobile cleaning device through the first wireless communication network, and relevant modules of the first wireless communication network are included in the base station, the laundry treatment device may be configured to be connected with the base station through the first wireless communication network, without changing structure of the base station to save cost.

In some embodiments, the first wireless communication network includes a Bluetooth communication network.

Communication between the mobile cleaning device and the base station is implemented through the first wireless communication network, and the first wireless communication network may be the Bluetooth communication network. The Bluetooth communication network is mainly used for short-distance data interaction. Using the Bluetooth communication network, the device has lower power consumption, strong anti-interference capability and low cost, and is suitable for large-scale usage. A distance between the mobile cleaning device and the base station may not be too far in most cases, and therefore communication requirements in most cases may be met.

In some embodiments, the second wireless communication network includes a wireless fidelity (WiFi) communication network.

The mobile cleaning device is connected with the cloud through the second wireless communication network, and the cloud is also connected with the laundry treatment device through the second wireless communication network. The WiFi communication network has strong flexibility and mobility. The network may be accessed at any position within a coverage area of a wireless signal, and users connected to a wireless Local Area Network (LAN) may move and maintain network connections. Even when the mobile cleaning device moves in a large range, communication connection of the mobile cleaning device with the cloud may also be maintained. The laundry treatment device usually brings the second wireless communication network by itself, therefore the cloud may also be connected with the laundry treatment device through the second wireless communication network, that is, the WiFi communication network. It may not result in a situation where connection of the communication network between the above devices is disconnected, and it ensures that the mobile cleaning device may acquire the base station position information.

It needs to be noted that selecting the first wireless communication network or the second wireless communication network is not limited in the embodiments of the disclosure, the above embodiments are only exemplary descriptions, and the selection may be made according to actual conditions.

An embodiment of the disclosure further provides a communication control apparatus of a mobile cleaning device. The communication control apparatus of the mobile cleaning device may be integrated in the mobile cleaning device. FIG. 4 is a structural block diagram of a communication control apparatus of a mobile cleaning device provided in an embodiment of the disclosure, and as shown in FIG. 4, the communication control apparatus of the mobile cleaning device includes a base station position acquisition instruction sending module 41 and a first base station position information receiving module 42.

The base station position acquisition instruction sending module 41 is configured to send a base station position acquisition instruction to a cloud through a second wireless communication network, after it is determined that a first wireless communication network between the mobile cleaning device and a base station is disconnected. The first base station position information receiving module 42 is configured to receive, through the second wireless communication network, base station position information sent by the cloud based on the base station position acquisition instruction. The base station position information is acquired by the cloud from a laundry treatment device through the second wireless communication network.

In an embodiment, the communication control apparatus of the mobile cleaning device further includes a second base station position information receiving module. The second base station position information receiving module 43 is configured to acquire the base station position information from the base station through the first wireless communication network, after it is determined that the first wireless communication network between the mobile cleaning device and the base station is connected.

Figure 5:
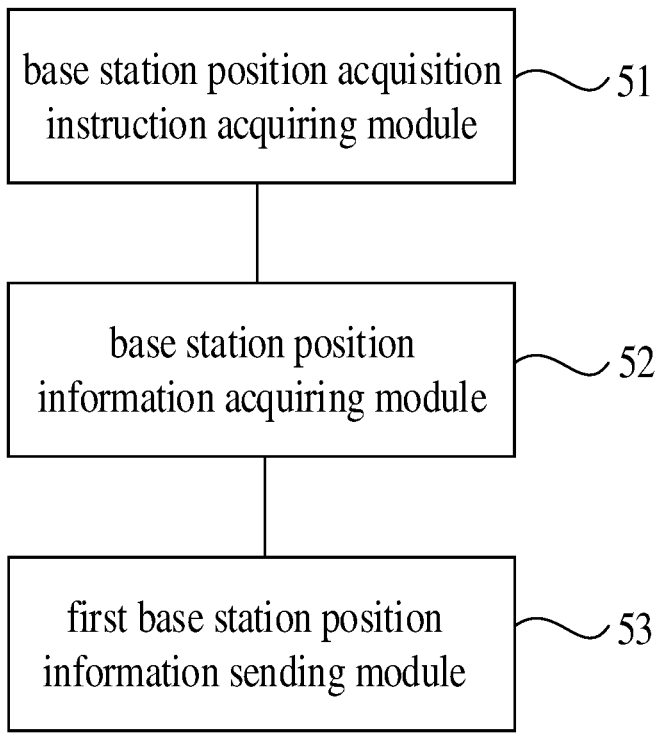
FIG. 5 is a structural block diagram of another communication control apparatus of a mobile cleaning device provided in an embodiment of the disclosure.

An embodiment of the disclosure further provides a communication control apparatus of a mobile cleaning device. The communication control apparatus of the mobile cleaning device may be integrated in the cloud. FIG. 5 is a structural block diagram of another communication control apparatus of a mobile cleaning device provided in an embodiment of the disclosure, and as shown in FIG. 5, the communication control apparatus of the mobile cleaning device includes a base station position acquisition instruction acquiring module 51, a base station position information acquiring module 52, and a first base station position information sending module 53.

The base station position acquisition instruction acquiring module 51 is configured to acquire a base station position acquisition instruction sent by the mobile cleaning device after it is determined that a first wireless communication network between the mobile cleaning device and a base station is disconnected. The base station position information acquiring module 52 is configured to acquire base station position information from a laundry treatment device through a second wireless communication network, according to the base station position acquisition instruction. The first base station position information sending module 53 is configured to send the base station position information to the mobile cleaning device through the second wireless communication network.

In an embodiment, the base station position information acquiring module 52 is also configured to: send a base station position request to the laundry treatment device through the second wireless communication network, according to the base station position acquisition instruction; and acquire, through the second wireless communication network, the base station position information sent by the laundry treatment device based on the base station position request.

Figure 6:
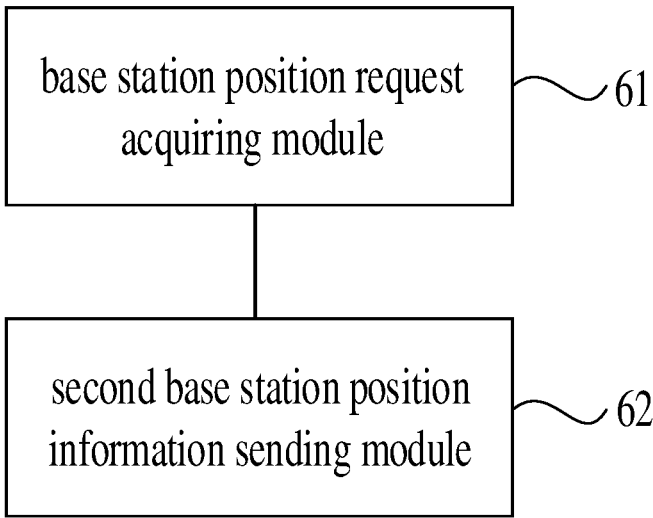
FIG. 6 is a structural block diagram of yet another communication control apparatus of a mobile cleaning device provided in an embodiment of the disclosure.

An embodiment of the disclosure further provides a communication control apparatus of a mobile cleaning device. The communication control apparatus of the mobile cleaning device may be integrated in a laundry treatment device. FIG. 6 is a structural block diagram of yet another communication control apparatus of a mobile cleaning device provided in an embodiment of the disclosure, and as shown in FIG. 6, the communication control apparatus of the mobile cleaning device includes a base station position request acquiring module 61 and a second base station position information sending module 62.

The base station position request acquiring module 61 is configured to acquire a base station position request sent by a cloud through a second wireless communication network. The second base station position information sending module 62 is configured to send base station position information to the cloud through the second wireless communication network based on the base station position request, so that the cloud sends the base station position information to the mobile cleaning device through the second wireless communication network. The base station position request is generated by the cloud after acquiring a base station position acquisition instruction sent by the mobile cleaning device, the base station position acquisition instruction is sent to the cloud by the mobile cleaning device after determining a first wireless communication network between the mobile cleaning device and a base station is disconnected.

In an embodiment, a position request information sending module 63 is configured to send position request information to the base station, so that the base station sends the base station position information to the laundry treatment device based on the position request information.

The disclosure further provides a computer-readable storage medium, the storage medium stores programs or instructions, the programs or instructions enable a computer to perform operations of the communication control method of the mobile cleaning device according to any one of the above embodiments, and thus it has advantageous effects described in the above embodiments, which are not elaborated here in the embodiments of the disclosure.

It is noted that examples of the readable storage medium include, but are not limited to electrical, magnetic, optical, electromagnetic, infrared or semiconductor systems, apparatuses or devices, or any combination of the above items. More specific examples (non-exhaustive list) of the readable storage medium include: an electrical connection with one or more wires, a portable computer disk, a hard disk, a Random Access Memory (RAM), a Read-Only Memory (ROM), an Electrical Programmable Read Only Memory (EPROM), an optical fiber, a portable Compact Disc Read-Only Memory (CD-ROM), an optical storage device, a magnetic storage device, or any suitable combination of the above items. Here, the readable storage medium may be any tangible medium containing or storing a program, the program may be used by or in combination with an instruction execution system, apparatus or device.

The computer storage medium provided in the above embodiment of the disclosure is based on the same inventive concept as the methods provided in the embodiments of the disclosure, and has the same advantageous effect as the methods used, performed or implemented by application programs or instructions stored in the computer storage medium.

An embodiment of the disclosure further provides a cleaning system, the cleaning system includes a mobile cleaning device, a laundry treatment device, and a base station. The mobile cleaning device sends a base station position acquisition instruction to a cloud through a second wireless communication network, after determining that a first wireless communication network between the mobile cleaning device and the base station is disconnected. The cloud acquires base station position information from the laundry treatment device through the second wireless communication network, based on the base station position acquisition instruction, and sends the base station position information to the mobile cleaning device through the second wireless communication network.

Figure 7:
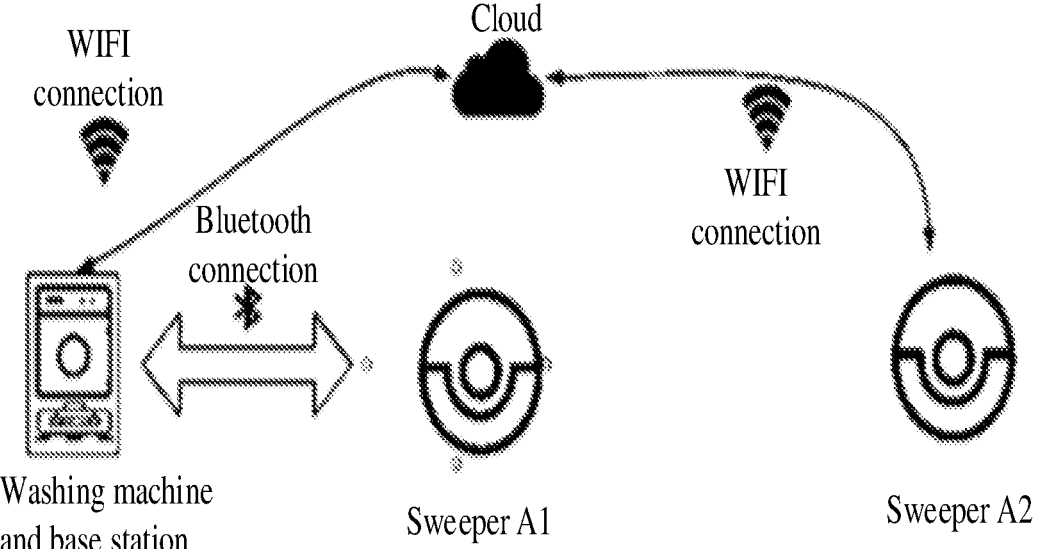
FIG. 7 is a schematic structural diagram of a cleaning system provided in an embodiment of the disclosure.

Exemplarily, FIG. 7 is a schematic structural diagram of a cleaning system provided in an embodiment of the disclosure, and as shown in FIG. 7, the mobile cleaning device is a sweeper, the laundry treatment device is a washing machine and a base station of the sweeper, the first wireless communication network is a Bluetooth connection, and the second wireless communication network is a WiFi connection. A sweeper A1 and a sweeper A2 are sweepers in different connection states, the sweeper A1 represents that the sweeper is connected with the base station through the first wireless communication network, and the sweeper A2 represents that the first wireless communication network between the sweeper and the base station is disconnected.

In a case that the sweeper is connected with the base station by a Bluetooth to perform information interaction therebetween, when the sweeper needs to return to the base station, the sweeper may receive the position of the base station through the Bluetooth connection, and then the sweeper may return to the base station successfully. However, in a case that the direct Bluetooth connection between the sweeper and the base station is disconnected, for example, the sweeper moves too far, the sweeper cannot acquire the base station position information and cannot return to the base station by itself. Therefore, after it is determined that the direct Bluetooth connection between the sweeper and the base station is disconnected, the sweeper may send the base station position acquisition instruction to the cloud through the WiFi connection. After receiving the instruction, the cloud may send a request to the washing machine through the WiFi connection, the washing machine may obtain the base station position information, then the washing machine sends the acquired base station position information to the cloud through the WiFi connection, and then the cloud sends the base station position information to the sweeper through the WiFi connection, so that the sweeper may return to the position of the base station after obtaining the base station position information.

It is noted that in FIG. 7, the washing machine and the base station may be integrated as an all-in-one machine. In other embodiments, the washing machine and the base station may also be provided separately. FIG. 7 only makes exemplary descriptions.

It is noted that relational terms here such as "first", "second" or the like are only intended to distinguish an entity or operation from another entity or operation, and do not necessarily require or imply that any such actual relationship or sequence is present between these entities or operations. Furthermore, terms "include" "contain" or any other variants thereof are intended to cover a non-exclusive inclusion, so that a process, method, article or device including a series of elements includes not only those elements, but also other elements which are not clearly listed, or elements inherent to the process, method, article or device. Without further limitation, an element defined by a sentence "include a . . . " does not exclude presence of additional identical elements in a process, method, article or device including the element.

The above descriptions are only exemplary implementations of the disclosure, to enable those skilled in the art to understand or implement the disclosure. Various modifications to these embodiments will be apparent to those skilled in the art, and general principles defined here may be implemented in other embodiments without departing from the spirit or scope of the disclosure. Therefore, the disclosure will not be limited to these embodiments described here, instead, should conform to the widest scope consistent with principles and novel characteristics disclosed here.

INDUSTRIAL APPLICABILITY

The communication control method of the mobile cleaning device provided in the disclosure includes the following operations. A base station position acquisition instruction is sent to a cloud through a second wireless communication network, after it is determined that a first wireless communication network between the mobile cleaning device and a base station is disconnected; base station position information sent by the cloud based on the base station position acquisition instruction, is received through the second wireless communication network, here the base station position information is acquired by the cloud from a laundry treatment device through the second wireless communication network. Since the mobile cleaning device is usually connected with the base station through the first wireless communication network, and thus after the first wireless communication network is disconnected, the mobile cleaning device cannot be communicated and connected with the base station directly and cannot acquire the base station position information. At this time, the mobile cleaning device of the embodiments of the disclosure may acquire the base station position information from the cloud through the second wireless communication network, so that the mobile cleaning device may return to the base station. The disclosure may prevent a situation where a data transmission between the mobile cleaning device and the base station cannot be achieved after the first communication network between the mobile cleaning device and the base station is disconnected, resulting in that the mobile cleaning device cannot return to the base station.

The invention claimed is:

1. A communication control apparatus of a mobile cleaning device, the apparatus comprising one or more processors, wherein the one or more processors are configured to:
    send a base station position acquisition instruction to a cloud through a second wireless communication network, after it is determined that a first wireless communication network between the mobile cleaning device and a base station is disconnected; and
    receive, through the second wireless communication network, base station position information sent by the cloud based on the base station position acquisition instruction,
    wherein the base station position information is acquired by the cloud from a laundry treatment device through the second wireless communication network.

2. The communication control apparatus of the mobile cleaning device according to claim 1, wherein the one or more processors are further configured to:
    acquire the base station position information from the base station through the first wireless communication network, after it is determined that the first wireless communication network between the mobile cleaning device and the base station is connected.

3. The communication control apparatus of the mobile cleaning device according to claim 1, wherein the laundry treatment device is connected with the base station through a wired or wireless communication network.

4. The communication control apparatus of the mobile cleaning device according to claim 1, wherein the first communication network comprises a Bluetooth communication network.

5. The communication control apparatus of the mobile cleaning device according to claim 1, wherein the second communication network comprises a wireless fidelity (WiFi) communication network.

6. A communication control apparatus of a mobile cleaning device, the apparatus comprising one or more processors, wherein the one or more processors are configured to:
    acquire a base station position acquisition instruction sent by the mobile cleaning device after it is determined that a first wireless communication network between the mobile cleaning device and a base station is disconnected;
    acquire base station position information from a laundry treatment device through a second wireless communication network, according to the base station position acquisition instruction; and
    send the base station position information to the mobile cleaning device through the second wireless communication network.

7. The communication control apparatus of the mobile cleaning device according to claim 6, wherein for acquiring the base station position information from the laundry treatment device through the second wireless communication network according to the base station position acquisition instruction, the one or more processors are further configured to:
    send a base station position request to the laundry treatment device through the second wireless communication network, according to the base station position acquisition instruction; and
    acquire, through the second wireless communication network, the base station position information sent by the laundry treatment device based on the base station position request.

8. The communication control apparatus of the mobile cleaning device according to claim 6, wherein the laundry treatment device is connected with the base station through a wired or wireless communication network.

9. The communication control apparatus of the mobile cleaning device according to claim 6, wherein the first communication network comprises a Bluetooth communication network.

10. The communication control apparatus of the mobile cleaning device according to claim 6, wherein the second communication network comprises a wireless fidelity (WiFi) communication network.

11. A communication control apparatus of a mobile cleaning device, the apparatus comprising one or more processors, wherein the one or more processors are configured to:

acquire a base station position request sent by a cloud through a second wireless communication network; and send base station position information to the cloud through the second wireless communication network based on the base station position request, so that the cloud sends the base station position information to the mobile cleaning device through the second wireless communication network, wherein the base station position request is generated by the cloud after acquiring a base station position acquisition instruction sent by the mobile cleaning device, wherein the base station position acquisition instruction is sent to the cloud by the mobile cleaning device after it is determined that a first wireless communication network between the mobile cleaning device and a base station is disconnected.

12. The communication control apparatus of the mobile cleaning device according to claim 11, wherein before sending the base station position information to the cloud through the second wireless communication network based on the base station position request, the one or more processors are further configured to:

send position request information to the base station, so that the base station sends the base station position information to a laundry treatment device based on the position request information.

13. The communication control apparatus of the mobile cleaning device according to claim 12, wherein the laundry treatment device is connected with the base station through a wired or wireless communication network.

14. The communication control apparatus of the mobile cleaning device according to claim 11, wherein the first communication network comprises a Bluetooth communication network.

15. The communication control apparatus of the mobile cleaning device according to claim 11, wherein the second communication network comprises a wireless fidelity (WiFi) communication network.

\* \* \* \* \*